United States Patent [19]

Lucast et al.

[11] Patent Number: 4,871,812
[45] Date of Patent: * Oct. 3, 1989

[54] MOLDABLE MEDICAL ADHESIVE

[75] Inventors: Donald H. Lucast, North St. Paul; Donald R. Battles, Arden Hills; Steven S. Kantner, St. Paul, all of Minn.

[73] Assignee: Minnesota Mining and Manufacturing Company, St. Paul, Minn.

[*] Notice: The portion of the term of this patent subsequent to Apr. 12, 2005 has been disclaimed.

[21] Appl. No.: 106,414

[22] Filed: Oct. 15, 1987

Related U.S. Application Data

[63] Continuation-in-part of Ser. No. 936,820, Nov. 28, 1986, Pat. No. 4,737,410.

[51] Int. Cl.$^4$ .............. B05D 3/04; B05D 3/12; C08L 79/04
[52] U.S. Cl. .................. 525/186; 428/343; 428/355; 428/356; 524/500; 524/516; 525/66; 525/73; 525/77; 525/205
[58] Field of Search .............. 428/355, 343, 356, 914, 428/145, 150; 525/186, 66, 73, 77, 205; 524/500, 516

[56] References Cited

U.S. PATENT DOCUMENTS

| | | | |
|---|---|---|---|
| 3,339,546 | 9/1967 | Chen | 128/156 |
| 4,166,051 | 8/1979 | Cilente et al. | 260/17.4 |
| 4,204,540 | 5/1980 | Cilento et al. | 128/283 |
| 4,231,369 | 11/1980 | Sorensen et al. | 128/283 |
| 4,300,820 | 11/1981 | Shah | 351/160 |
| 4,337,325 | 6/1982 | Shah | 525/205 |
| 4,369,229 | 1/1983 | Shah | 428/421 |
| 4,370,380 | 1/1983 | Shah | 428/355 |
| 4,404,246 | 9/1983 | Charbonneau et al. | 428/355 |
| 4,462,665 | 7/1984 | Shah | 351/160 |
| 4,474,928 | 10/1984 | Hoenig et al. | 525/186 |
| 4,477,325 | 10/1984 | Osburn | 204/139.12 |
| 4,496,357 | 1/1985 | Osburn | 604/336 |
| 4,510,197 | 4/1985 | Shah | 428/220 |
| 4,693,776 | 9/1987 | Krampe et al. | 428/355 |
| 4,732,808 | 3/1988 | Krampe et al. | 428/355 |
| 4,759,983 | 7/1988 | Knutson et al. | 428/355 |

FOREIGN PATENT DOCUMENTS 8400506 10/1984 PCT Int'l Appl. .

OTHER PUBLICATIONS

Shah, "Novel Two-Phase Polymer System", *Polymer*, 1987, vol. 28, Jun., pp. 1212-1216.

Primary Examiner—Herbert J. Lilling
Attorney, Agent, or Firm—Donald M. Sell; Walter N. Kirn; Carolyn A. Bates

[57] ABSTRACT

A moldable, putty-like adhesive mass is disclosed comprising a blend of (1) an acrylate terpolymer adhesive containing a hydrophilic macromolecular moiety and (2) a reinforcing material which is a carbonylamido group containing polymer. The adhesive blends are moisture vapor permeable and non-water swellable. They are useful in many medical applications.

30 Claims, No Drawings

MOLDABLE MEDICAL ADHESIVE

RELATED APPLICATIONS

This invention is a continuation-in-part of copending application Ser. No. 936,820 filed Nov. 28, 1986 now U.S. Pat. No. 4,737,410.

FIELD OF THE INVENTION

This invention relates primarily to the field of pressure-sensitive adhesives for use on skin. More specifically, it relates to self supporting putty-like adhesive masses which can be molded and shaped to body contours.

BACKGROUND ART

Self-supporting adhesive masses have been used in the medical field primarily as skin barriers for protecting skin around a stoma from contact with the corrosive effluent which is discharged through the stoma. Such adhesive masses generally include a hydrocolloid component such as pectin, gelatin, guar gum, karaya gum, carboxymethylcellulose, etc. to provide liquid absorbency.

U.S. Pat. No. 4,166,051 describes a putty-like adhesive mass for use as a skin barrier comprising a pressure sensitive adhesive base, e.g., a polyisobutylene having incorporated therein mineral oil, a hydrocolloid gum such as pectin and a cohesive strengthening agent such as finely divided cellulose, insoluble cross-linked dextran or insoluble cross-linked carboxymethylcellulose.

U.S. Pat. No. 4,496,357 also discloses a skin barrier composition comprising an elastomer such as polyisobutylene and a hydrocolloid. The composition further comprises fumed silica to control the swelling of the hydrocolloid.

In general, self-supporting adhesive masses for use on skin, such as those described above, have suffered from a number of disadvantages. The problem of swelling due to the presence of a hydrocolloid component has not been satisfactorily overcome. Swelling causes the adhesive mass to lose tack and degrade. Additionally, such adhesive masses are not permeable to moisture vapor and do not allow the skin to breath. They rely primarily on water absorbency to remove excess moisture from the skin surface.

SUMMARY OF THE INVENTION

The present invention overcomes the aforementioned disadvantages by providing a self-supporting, putty-like adhesive mass for use on skin which is essentially nonswellable and resistant to degradation by moisture and body fluids. It also has a very high moisture vapor transmission rate which allows the skin to breath and prevents skin maceration. Additionally, the adhesive mass of the present invention provides good adhesion, resistance to shear forces and controlled adhesion build-up over time to minimize skin damage upon removal.

The adhesive mass of the invention is a blend of a hydrophilic, highly moisture vapor permeable acrylate pressure sensitive adhesive and a reinforcing polymeric material which is a carbonylamido group-containing polymer. The reinforcing agent provides the pressure sensitive adhesive with increased cohesive strength, controls adhesion build up after application to the skin, and minimizes the problem of adhesive residue remaining on the skin following removal of the adhesive. The creep compliance of the adhesive is significantly reduced, i.e., by at least a factor 2, by blending with the reinforcing agents. Creep compliance values in the range of about $0.4 \times 10^{-5}$ to about $3.0 \times 10^{-5}$ cm$^2$/dyne, measured according to standard test methods (See U.S. Pat Nos. 4,260,659 and 4,374,883.), are readily achieved.

The adhesive mass of the invention has a putty-like consistency allowing it to be shaped or molded to body contours. It can be formed into sheets, ribbons, washers, etc., and cut or molded into the desired shape. It can be used to fill spaces under a dressing so as to provide resistance to shear forces applied to the dressing. It can also be used to support devices attached to the body such as ostomy appliances, for sealing around urinary diversions, gastrostomy or biliary tubes, and for smoothing body contours such as in dressing sacral ulcers. If one side has been detackified or laminated to a backing, the adhesive mass can be used as a wound dressing. Other medical uses for the adhesive mass will be obvious to the medical practitioner.

According to the present invention, there is provided a self-supporting putty-like adhesive mass comprising a blend of the following:

(1) a terpolymer of A, B and C monomers where A is a hydrophobic monomeric acrylic acid ester of a nontertiary alcohol, the alcohol having from 4 to about 14 carbon atoms; B is at least one polar monomer copolymerizable with the A monomer having hydroxyl, carboxylic, sulfonic or phosphonic functionality, the amount by weight of B monomer being about 2 to 30% of the total weight of all monomers in the terpolymer; and C is a hydrophilic macromolecular monomer of the formula X—Y—Z wherein X is a vinyl group copolymerizable with the A and B monomers, Y is a divalent linking group, and Z is a monovalent polymeric moiety comprising a polyether essentially unreactive under free radical initiated copolymerization conditions, the amount by weight of C monomer being about 5 to 30% of the total weight of all monomers in the terpolymer;

(2) at least one carbonylamido group-containing polymer.

The reinforcing material is present in sufficient amounts to provide a two-mil (0.05 mm) thick film of the adhesive mass with a tensile strength of at least about 400 KPa and maximum elongation of about 1000 percent.

The adhesive mass, when measured as a one-mil (0.025 mm) thick film, has a minimum moisture vapor transmission of at least 1000 grams per square meter per 24 hours at 40° C. and a relative humidity differential of about 80 percent.

The preferred reinforcing material for use in the blend is a carbonylamido group-containing polymer selected from the group consisting of: a poly(alkyloxazoline) having a molecular weight above about 1,000; a poly(N-vinyllactam); a copolymer of a N-vinyl lactam; a polymer of a mono- or dialkyl substituted acrylamide; a copolymer of a mono or dialkyl acrylamide; and a mixture of two or more of the foregoing.

The preferred pressure sensitive adhesive for use in the blend is a terpolymer of iso-octyl acrylate (70%), acrylic acid (15%), and methoxypoly(ethylene oxide) acrylate (15%). The preferred reinforcing agent is poly(2-ethyloxazoline) having a molecular weight of 50,000 and constituting approximately five percent by weight of the adhesive mass.

DETAILED DESCRIPTION

Copending application Ser. No. 936,820 filed Nov. 28, 1986 (Kantner), the disclosure of which is incorporated herein by reference, discloses blending acrylate copolymer pressure sensitive adhesives with poly(alkyloxazolines) to enhance the cohesive strength of the adhesive without significant losses in peel strength and tack. It has been found that poly(alkyloxazolines) as well as other carbonylamido group-containing polymers, e.g., poly(n-vinyl lactams) and alkyl-substituted polyacrylamides, can be blended with certain hydrophilic, highly moisture vapor permeable, pressure-sensitive acrylate adhesives to provide moldable, putty-like adhesive masses having good cohesive strength and other properties which make them useful in a number of medical applications.

The hydrophilic, highly moisture vapor permeable acrylate adhesives useful in preparing the blends of the present invention include certain of the so-called "Moist Skin Adhesives" disclosed in International Application No. PCT/US84/00506, the disclosure of which is incorporated herein by reference. These adhesives are terpolymers formed by the copolymerization of A, B and C monomers where A is a hydrophobic monomeric acrylic acid ester of a non-tertiary alcohol having 4 to about 14 carbon atoms, B is at least one polar monomer copolymerizable with the A monomer having hydroxyl, carboxylic, sulfonic or phosphoric functionality; C is a hydrophilic macromolecular monomer of the formula X—Y—Z wherein X is a vinyl group copolymerizable with the A and B monomers, Y is a divalent linking group, and Z is a monovalent polymeric moiety comprisng a polyether essentially unreactive under free radical initiated copolymerization conditions. The amount by weight of C monomer is preferably about 5 to 30% of the total weight of all monomers is the terpolymer.

As indicated above, the A monomer of the pressure-sensitive adhesive terpolymer is a hydrophobic acrylic acid ester of a non-tertiary alcohol, which alcohol contains 4 to about 14 carbon atoms and preferably about 6 to 12 carbon atoms. It is preferred that the non-tertiary alcohol be an alkyl alcohol. By the use of the term "hydrophobic" in connection with the A monomer is meant that the A monomer lacks substantial affinity for water.

Examples of suitable monomers for use as the A monomer include the esters of acrylic acid or methacrylic acid with non-tertiary alcohols such as 1-butanol, 2-butanol, 1-pentanol, 2-pentanol, 3-pentanol, 2-methyl-1-butanol, 1-hexanol, 2-hexanol, 2-methyl-1-pentanol, 3-methyl-1-pentanol, 2-ethyl-1-butanol, 3,5,5-trimethyl-1-hexanol, 3-heptanol, 1-octanol, 2-octanol, isooctyl alcohol, 2-ethyl-1-hexanol, 1-decanol, 1-dodecanol, 1-tridecanol, 1-tetradecanol and the like. The preferred A monomer is the ester of acrylic acid with isooctyl alcohol.

It is to be understood that the pressure-sensitive adhesive terpolymer may comprise a single type of A monomer or may comprise two or more different A monomers.

The polar B monomers suitable for use in accordance with this invention are those having hydroxyl, carboxylic, sulfonic, or phosphonic acid functionality. Representative examples are 2-hydroxyethylacrylate, 2-hydroxyethylmethacrylate, hydroxypropylacrylate, acrylic acid, methacrylic acid, itaconic acid, maleic acid, fumaric acid, vinyl benzoic acid, 2-carboxyethylacrylate, 2-sulfoethylmethacrylate, and 4-vinyl phenyl phosphonic acid. Preferred B monomers are acrylic acid, methacrylic acid, 2-carboxyethylacrylate, itaconic acid, 2-hydroxyethylacrylate, hydroxypropylacrylate, and 2-sulfoethylmethacrylate. The amount by weight of B monomer preferably does not exceed about 30% of the total weight of all monomers, such that excessive firmness of the adhesive is avoided. Incorporation of B monomer to the extent of about 10% to about 15% by weight is most preferred and provides for compatible blends possessing good cohesive and adhesive properties.

It is to be understood that the pressure-sensitive adhesive terpolymer may comprise a single type of B monomer or may comprise two or more different B monomers.

Monomer C of the pressure-sensitive adhesive is a hydrophilic macromolecular monomer which has a vinyl group copolymerizable with the A and B monomers. By the use of the term "hydrophilic" in connection with the C monomer is meant that the C monomer has substantial affinity for water. It is preferred that the C monomer contain only one vinyl group copolymerizable with the A and B monomers.

Monomer C is a hydrophilic macromolecular monomer containing a plurality of hydrophilic sites which impart the required hydrophilicity to the monomer. Monomer C may be represented by the general Formula I $$X—Y—Z \qquad \text{I}$$

wherein X is a vinyl group copolymerizable with the A and B monomers, Y is a divalent linking group, and Z is a monovalent polymeric moiety, i.e., containing two or more monomer units, comprising a polyether essentially unreactive under the free radical initiated, copolymerizing conditions employed to form the pressure-sensitive adhesive terpolymer.

The preferred X group of the C monomer is of the general Formula II:

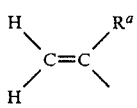

wherein $R^a$ is a hydrogen atom or a methyl group.

The preferred Y group of the C monomer is a

group (i.e., a divalent carbonyl group).

The preferred Z moiety of the C monomer is a monovalent polyether of the general formula III $$—W—OR^b \qquad \text{III}$$

wherein $R^b$ is hydrogen, lower alkyl, phenyl, or substituted phenyl; and W is a divalent poly(lower alkylene oxide) group containing 2 to about 250 repeating alkoxy units and selected from the group consisting of a poly(ethylene oxide) radical, a poly(propylene oxide) radical, a radical of a copolymer of ethylene oxide and propylene oxide, and a poly(tetramethylene oxide) radical. In a most preferred C monomer, a monovalent polyether of Formula III is bonded covalently to the carbonyl group (i.e., where Y is divalent carbonyl) through a terminal oxygen atom contained in the W moiety.

Preferably, the W moiety of Formula III contains about 5 to 250 repeating alkoxy units. More preferably, the W moiety contains about 5 to 125 repeating alkoxy units. Most preferably, the W moiety contains about 10 to 25 repeating alkoxy units.

The most preferred W moiety of Formula III is a poly(ethylene oxide) radical, a poly(propylene oxide) radical, or a radical of a copolymer of ethylene oxide and propylene oxide.

A variety of C monomers are available commercially. For example, commercially available C monomers which have been found to be suitable are the 2-(2-ethoxyethoxy)ethyl acrylate which is available under the trade designation "SR-256" from Sartomer Company, West Chester, PA; the methoxy poly(ethylene oxide)$_{10}$ acrylate which is available under the trade designation "No. 8816" from Monomer-Polymer & Dajac Laboratories, Inc., Trevose, PA; the methoxy poly(ethylene oxide) methacrylates of 200 Daltons, 400 Daltons, and 1000 Daltons which are available under the trade designations "No. 16664", "No. 16665" and "No. 16666", respectively, from Polysciences, Inc., Warrington, PA; the hydroxy poly(ethylene oxide)$_5$ methacrylate which is available under the trade designation "No. 16712" from Polysciences, Inc., Warrington, PA.

Other preferred C monomers may be prepared using commercially available starting materials and conventional methods. For example, the preferred C monomers wherein $R^b$ of Formula III is lower alkyl may be prepared by reacting an $\alpha,\beta$-unsaturated carboxylic acid such as acrylic acid or methacrylic acid with an equimolar amount of mono-alcohol of a poly(lower alkylene oxide). The esterification reaction is generally conducted under anhydrous conditions in an organic solvent which preferably will form an azeotropic mixture with the water which is generated as the esterification reaction proceeds. A suitable solvent is toluene. Typically, the alcohol is combined with the organic solvent and the unsaturated carboxylic acid is then added thereto. The reaction is conducted in the presence of an acid catalyst such as para-toluenesulfonic acid and a free-radical inhibitor such as copper powder. The reaction mixture is refluxed for generally 16 to 18 hours under nitrogen, and the water generated is removed by azeotropic distillation.

Examples of suitable mono-hydroxyl-terminated poly(lower alkylene oxides) which may be used to prepare the preferred C monomers using the above-described procedure include Carbowax TM 350, Carbowax TM 550, Carbowax TM 750, Carbowax TM 2000 and Carbowax TM 5000 (i.e., the methoxy-poly(ethylene oxide) ethanols of about 350 MW, 550 MW, 750 MW, 2000 MW and 5000 MW, respectively, commercially available from Union Carbide Corp.); a monoalcohol of a poly(tetramethylene oxide) of about 16,000 MW prepared as described in connection with "B-9" in International Application No. PCT/US84/00506; UCON TM BL-285 (an n-butoxy poly(propylene oxide) propanol having about a 1000 MW, commercially available from Union Carbide Corp.); UCON TM 50-HB260 (an n-butoxy poly(ethylene oxide/propylene oxide) [50:50 by weight] alcohol having about a 1000 MW, available from Union Carbide Corp.); and Pycal TM 94 (a phenoxy poly(ethylene oxide)$_4$ ethanol, available from Atlas Chemical Industries.).

C monomers wherein $R^b$ is hydrogen may be prepared by reacting an $\alpha,\beta$-unsaturated carboxylic acid or hydroxyalkyl ester with an anhydride selected from monoepoxides, lactones or mixtures thereof as taught in U.S. Pat. No. 4,126,527, incorporated herein by reference.

The preferred C monomer for employment in preparing the pressure-sensitive adhesive copolymer is the acrylate ester of above-described Carbowax TM 750.

It is to be understood that the pressure-sensitive adhesive terpolymer may comprise a single type of C monomer or may comprise two or more different monomers.

The adhesive properties of the pressure-sensitive adhesive component of the blends of the invention vary depending upon the particular combination and relative amounts of the A, B and C monomers employed in preparing the terpolymer as is well known in the art.

In general, the C monomer is present in an amount of about 5 to 30% of the total weight of all monomers in the terpolymer and the B monomer is present in an amount of about 2 to 30% of the total weight of all monomers. The particular amounts of the A, B and C monomers employed depend on the nature of the A, B and C monomers selected. The amounts of the B and C monomers may be varied within the above ranges so long as the resulting adhesive terpolymer exhibits the desired adhesive properties. The amount of A monomer employed is preferably about 50 to 90% by weight of the total weight of all monomers in the terpolymer, and is most preferably about 60 to 80% of the total weight of all monomers. Preferred amounts for both the B and C monomers are about 10 to 15% by weight based upon the total amount of all monomers in the terpolymer.

Terpolymers containing solely A, B and C monomers of appropriate types and in appropriate amounts perform suitably in the practice of the invention. However, the terpolymers may further include minor amounts of non-essential monomers such as methylacrylate, ethylacrylate, vinylacetate and the like.

It may be desirable in some instances in the practice of the invention to increase internal strength or cohesiveness of the terpolymer by crosslinking the terpolymer using conventional methods. For example, up to approximately 1% of acryloxybenzophenone can be copolymerized into the backbone, permitting crosslinking by ultraviolet light. Alternatively, the final mixture can be subjected to gamma irradiation at a dose greater than about 2.5 MRAD to achieve crosslinking. Any of several well-known chemical crosslinking methods may also be used.

The pressure-sensitive adhesive terpolymers may be prepared using conventional free-radical-polymerization methods. One particularly convenient method is the following. The desired amounts of A, B and C monomers and an organic solvent in which the monomers are soluble are combined in a sealable bottle. A particularly suitable solvent is ethyl acetate. A solvent such as isopropyl alcohol which functions as a chain-transfer agent is also present in the reaction medium in order to control the molecular weight of the resulting adhesive terpolymer. A catalytic amount of a free-radical initiator such as 2,2'-azobisisobutyronitrile is then added to the solution. Nitrogen is bubbled through the solution to purge air from within the bottle, and the bottle is then sealed. The sealed bottle is tumbled in a heated water bath for a period of time sufficient to effect essentially complete polymerization. Generally, 24 hours has been found to be sufficient time to effect essentially complete polymerization when the water bath is maintained at about 55° C.

Copolymerization of the A, B and C monomers is effected so as to provide an acrylate (or methacrylate) terpolymer having an inherent viscosity in a range of about 0.5 to 1.2, preferably from about 0.6 to about 0.9. For terpolymers of inherent viscosity below about 0.5, less than optimum enhancement of cohesive strength is obtained at the levels of reinforcing agent (and polar monomer) consistent with this invention, and higher levels result in poor adhesive properties. Terpolymers of inherent viscosity greater than about 1.2, when blended with the reinforcing agent, have less than optimum adhesive properties.

The term "carbonylamido group-containing polymer", as used herein to describe the reinforcing agents blended with the terpolymer refers to a polymer which contains amide groups

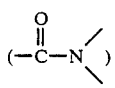

wherein no more than one hydrogen atom is bonded to the nitrogen atom.

Carbonylamido group-containing polymers that are useful for preparing the blends of the present invention contain mono or dialkylsubstituted carbonylamido moieties. These polymers include homopolymers, i.e. polymers derived from one specific monomer, and copolymers, i.e. polymers derived from two or more carbonylamido-group containing monomers or polymers derived from at least one carbonylamido group-containing monomer and at least one noncarbonylamido group-containing monomer copolymerizable therewith. Copolymers of a carbonylamido group-containing monomer with an ethylenically unsaturated copolymerizable monomer which is not a carbonylamido group-containing monomer should preferably contain a major amount of the carbonylamido group-containing monomer.

Representative examples of carbonylamido group containing polymers that are useful in this invention are illustrated by the following examples.

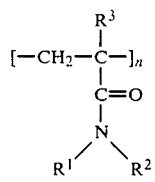 I

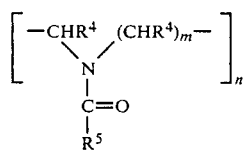 II

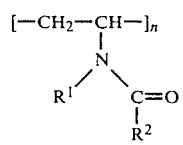 III

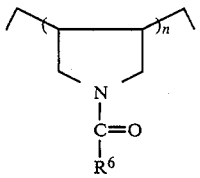 IV where
$R^1$ and $R^2$ independently represent an alkyl or inertly-substituted alkyl group, having from one to eight carbon atoms, preferably one to three carbon atoms, or $R^1$ and $R^2$ together can be represented by $(-CH_2-)_x$ where x is an integer from two to five, or $R^2$ can be hydrogen;

$R^3$ represents hydrogen or an alkyl or inertly-substituted alkyl group having from one to six carbon atoms, preferably hydrogen or a methyl group;

$R^4$ represents hydrogen or an alkyl or inertly-substituted alkyl group having one to three carbon atoms; and m is one or two;

$R^5$ represents hydrogen, aryl or alkyl having up to about 20 carbon atoms (or inertly-substituted derivatives therof); and $R^6$ represents hydrogen or an alkyl or inertly-substituted alkyl group having from one to eight carbon atoms, preferably from one to three carbon atoms.

The terminology "inertly-substituted" means that the moiety contains no substituent group which interferes with the polymerization of the monomer with the ability of the resultant carbonylamido group-containing polymer to form an acceptable blend with the acrylate or methacrylate terpolymer. Illustrative inert substituents include halogen, alkenyl, alkyl, alkoxy, etc.

The preferred reinforcing agents for use according to the present invention are carbonylamido group-containing polymers selected from the group consisting of poly(alkyloxazolines) having a molecular weight above about 1,000, poly(N-vinyl-lactams), copolymers of a N-vinyl lactam and polymers and copolymers of a mono- or dialkyl acrylamide.

The poly(alkyloxazolines) reinforcing agents suitable for blending with the above-described acrylate or methacrylate terpolymers to form the compositions of this invention are polymers having pendant N-acyl groups, as shown in Structure II above:

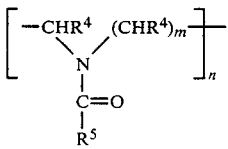

These polymers are readily prepared by the ring-opening polymerization of 2-oxazolines or like compounds having a structure as follows:

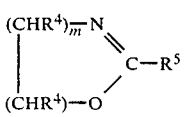

Both homopolymers and copolymers of two or more monomers are useful. As indicated above, $R^5$ may be hydrogen, alkyl, halogenated alkyl, aryl, halogenated aryl, aralkyl, alkylaryl, saturated alicyclic, or alkenyl, as detailed in U.S. Pat. No. 3,483,141 which describes a process for the preparation of such polymers. Since m may be either 1 or 2, the term poly(alkyloxazoline) is technically meant to encompass both poly(2-oxazolines) and poly(2-oxazines).

The ring-opening polymerization of 2-oxazoline monomers is generally conducted in the presence of a cationic polymerization catalysts at a reaction temperature of about 0°–200° C. Typical catalysts include strong mineral acids, organic sulfonic acids and their esters, acidic salts such as ammonium sulfate, Lewis acids such as aluminum trichloride, stannous tetrachloride, boron trifluoride and organic diazoniumfluoroborates, dialkyl sulfates, and other like catalysts. This polymerization is further described in *Ring-Opening Polymerization*, Volume 2, edited by K. J. Ivin and T. Saegusa (1984).

In preparing the adhesive compositions of this invention, poly(alkyloxazolines) of molecular weight within a range from about 1,000 to about 2,000,000 are utilized. Polymers of molecular weight below 1,000 provide only weak reinforcement, and those above 2,000,000 generally produce pressure sensitive adhesives which lack the required moldability. Molecular weights of from about 2,000 to about 500,000 are preferred, with from about 5,000 to about 50,000 being most preferred. Also, preferred are oxazoline polymers where n is 1, $R^4$ is hydrogen, and $R^5$ is selected from hydrogen and alkyl groups containing up to about 10 carbon atoms, with the most preferred $R^5$ substituents being hydrogen, methyl, ethyl, and propyl.

While the poly(alkyloxazolines) are the preferred reinforcing agents for use in the present invention, other carbonylamido group-containing polymers may be used. Examples include homopolymers and copolymers of N-vinyl-lactams such as poly(N-vinyl pyrrolidone) and copolymers of N-vinyl pyrrolidone and vinyl acetate, homo and copolymers of mono and dialkyl substituted acylamides such as poly(dimethyl acrylamide) and copolymers of dimethylacrylamide and iso-octyl acrylate. These polymeric materials are either commercially available or made by well-known chemical procedures. Polymers having molecular weights in the range of about 2,000 to 500,000 are generally suitable. Preferred polymers typically have a molecular weight range of about 5,000 to 100,000. When the reinforcing agent is a copolymer of a carbonylamido group-containing monomer and a non-carbonylamido group-containing monomer, the latter monomer should be non-reactive with the carbonylamido group and should not be present in sufficient quantities to dilute the carbonylamido portion of the copolymer to the point that it does not sufficiently interact with the adhesive.

When the reinforcing agent is a homopolymer or a copolymer of a dialkyl substituted acrylamide, the alkyl groups preferably contain one to four carbon atoms. In the case of monoalkyl substitued acrylamides, the alkyl group preferably contains four to eight carbon atoms.

Acceptable blends of the present invention are typically optically clear or slightly hazy in appearance, indicating homogeneity to the extent that no discrete particles of either component greater than about 4000 A in diameter are present. The blends may be prepared "post-polymerization" by mixing solutions or dispersions of the reinforcing agent and the acrylate terpolymer composition in any desired vehicles or solvents which are miscible. Melt blending is useful, as well.

Blending may also be carried out "pre-polymerization" by dissolving the poly(alkyloxazoline) or other reinforcing agent in the monomer/initiator/diluent mixture.

As stated previously, the reinforcing agent is added in an amount so as to provide the blend with the appropriate cohesive strength, and tensile and elongation properties (i.e., the desired putty-like characteristics). A two-mil thick film of the adhesive mass should have a tensile strength of at least about 400 KPa, preferably 500–1500 KPa and a maximum elongation of about 1000 percent, preferably 500–750 percent. Such properties (with retention of appropriate adhesive properties) are typically achieved via addition of from about 1% to about 15% by weight of the reinforcing agent. In the case of poly(alkyloxazolines), from about 2% to 10 percent by weight of the blend is generally used. A range of from about 2 to about 6 percent by weight is preferred. For poly(N-vinyl lactams), the preferred range is 1.5 to 5 weight percent and for polyacrylamides, 2–8 weight percent.

As indicated above, the putty-like adhesives of the present invention are essentially non-swellable and resistant to degradation by moisture or body fluids such as urine. By "non-swellable" is meant that the adhesive mass does not absorb more than about 20 percent of its weight of water when submerged in water at room temperature for 24 hours. The adhesives of the invention are also highly moisture vapor permeable. These properties make them useful in a variety of medical applications.

The adhesive blends of the invention can be provided as sheets, wafers, ribbons, ropes, circles, etc., on a liner, and the user can cut or mold them into the desired shape. Sheets of the adhesive mass may also be laminated to a conventional highly moisture permeable backing, preferably having a moisture vapor transmission rate of at least 1000 grams/square meter/24 hours at 40° C. and an 80% relative humidity differential, to provide dressings for various applications. The adhesives are especially useful as skin barriers and skin protectors, for attaching devices such as ostomy appliances, catheters and incontinence devices to the body, and for smoothing body contours under dressings to enhance adhesion of the dressing in highly contoured areas.

EXAMPLES

The invention is further illustrated by the following non-limiting examples, in which all parts are by weight per hundred parts of polymer unless otherwise stated.

The following test methods were used to obtain the data set forth in the examples.

Tensile/Elongation

Reference: ASTM D-3759, PSTC 31

This test method describes the determination of tensile and elongation of a sample, using an Instron Tensile Tester.

An Instron Tester, "English" scale, equipped with clamp-type jaws and an "English" scale load cell is used. The jaw faces should be coated with rubber or some other type of non-slip surface.

The strip of material to be tested should be 2 mils (0.05 mm) thick and approximately 4 inches (10.2 cm) longer than the initial jaw separation and 1 inch (2.5 cm) or less in width. Where applicable, the test material should be cut in the machine direction.

The equipment should be set up as follows:

| Expected Elongation | Cross-head Speed | Chart Speed | Gauge Length |
| --- | --- | --- | --- |
| *Less than 100% | 5"/min. (12.7 cm) | 10"/min. | 5"(12.7 cm) |
| 100% to 400% | 10"/min.(25.4 cm) | 10"/min. | 2"(5.1 cm) |
| More than 400% | 10"/min.(25.4 cm) | 10"/min. | 1"(2.5 cm) |

The load range is selected so that the point of maximum force will fall between 30–90% of full scale. To begin the test, the test sample is aligned and clamped into the upper and lower jaws. The pen and chart are started in motion, and the tensile tester is started.

The stress plot is followed on the recording chart. If the chart limit is being approached, successively higher loads should be read. The test is allowed to continue until rupture of the sample.

Tensile strength is the maximum force applied to the test sample to obtain the tensile value. This is determined by counting the number of small divisions reached by the pen in its maximum travel to the right across the chart during the test. The maximum tensile value point and the point of rupture may or may not coincide. Maximum force is calculated in pounds by use of the following equation:

$$\text{Max. Force} = \frac{\text{Load Range} \times \text{Max. Small Divisions}}{100}$$

Tensile in pounds per width is reported and converted to KPa units.

Elongation is the maximum percent of stretch reached by the test specimen. To obtain the percent of elongation, the number of horizontal small divisions reached in the vertical chart dimension from the start to the point of specimen rupture is counted. This number is used to calculate the percent elongation by use of the following equation:

$$\% \text{ Elongation} = \frac{10 \times \text{Small Divisions} \times \text{Cross-head Speed}}{\text{Gauge Length} \times \text{Chart Speed}}$$

Moisture Vapor Permeability

Reference: ASTM E-9680

A modified Payne cup method is used. The method comprises the following steps:
(1) A 1⅜ inch (35 mm) diameter sample of 1 mil (0.025 mm) thick material to be tested containing no perforations is cut and laminated to a porous nonwoven web having a moisture vapor transmission rate of about 10,000 grams per square meter per 24 hours at 40° C. and an 80% relative humidity differential.
(2) The sample is entered between the adhesive surfaces of two foil adhesive rings, each having a one-inch (2.54 cm) diameter hole. The holes of each ring are carefully aligned. Finger pressure is used to form a foil/sample/foil assembly that is flat, wrinkle-free and has no void areas in the exposed sample.
(3) A 4-ounce (0.14 kg) glass jar is filled half full of distilled water. The jar is fitted with a screw on cap having a 1.50 inch (3.8 cm) diameter hole in the center thereof and with a 1.75 inch (4.445 cm) diameter rubber washer having a 1.12 inch (2.84 cm) diameter hole in its center.
(4) The rubber washer is placed on the lip of the jar and the foil/sample assembly is placed on the rubber washer. The lid is then screwed loosely on the jar.
(5) The assembly is placed in a chamber at 100° F. (38° C.) and 20 percent relative humidity for four hours.
(6) The cap is tightened inside the chamber so the sample material is level with the cap (no bulging) and the rubber washer is in proper seating position.
(7) The assembly is removed from the chamber and weighed immediately to the nearest 0.01 gram (initial weight —$W_1$).
(8) The assembly is returned to the chamber for at least 18 additional hours.
(9) The assembly is removed from the chamber and weighed immediately to the nearest 0.01 gram (final weight —$W_2$).
(10) The water vapor transmission in grams of water vapor transmitted per square meter of sample area in 24 hours is calculated according to the following formula:

$$MVT = (W_1 - W_2) \frac{4.74 \times 10^4}{T \text{ (hours)}}$$

$W_1$ = initial weight (grams)
$W_2$ = final weight (grams)
$T^2$ = time (hours)
When a ½ inch (1.27 cm) sample is tested, the formula is changed to the following:

$$MVT = (W_1 - W_2) \frac{1.9 \times 10^5}{T \text{ (hours)}}$$

(11) Three samples of each material should be run and the average taken.

TACK

The tack of the adhesives was qualitatively assessed by a "finger appeal" test and assigned a value of 1 through 5 where 1=tack free, 2=poor tack, 3=medium tack, 4=good tack, and 5=excellent tack. On this scale "Scotch" "Magic" transparent tape (Trademark of Minnesota Mining and Manufacturing Company) has a rating of 5.

SKIN ADHESION

Adhesion to skin was determined on human volunteers. The adhesives were tested as 1 mil (0.025 mm) thick films on a 1 mil (0.025 mm) polyurethane backing. The film/backing laminate was cut into 1×3 inch ((2.5×7.6 cm) strips which were applied to the (dry) backs of each of 6 individuals (i.e., 3 men and 3 women, randomly selected) who were lying on procedure tables in prone positions with arms at the sides and heads turned to one side. For each individual, three strips of the test material were applied to one or the other side of the spinal column and positioned such that the length of each strip was at a right angle to the spinal column. The strips were applied without tension or pulling of the skin and there was at least a ⅛ to ⅜ inch (0.32–0.95 cm) space between each strip. After all strips were in place, a 4.5 pound (9.9 kg) rubber roller according to the specifications found in the 7th Edition of the Pressure-Sensitive Tape Council Brochure (1976), was rolled along the length of each strip, once in each direction, at a travel speed of about 3 inches (7.6 cm) per second, to assure even pressure application to each strip. When rolling the strip, no manual pressure was applied to the roller.

To determine the adhesive value, each strip was removed using a conventional adhesion tester having a 25# test line and a 1-inch (2.54 cm) clip attached to the test line. The clip was attached to the edge of the strip which is farthest from the spinal cord, the clip being attached by manually lifting about ½-inch (1.27 cm) of that edge of the strip and attaching the clip thereto. This orientation permitted the strip to be removed towards the spine so that pull was with the direction of fine hair growth on the back. This was facilitated by positioning the adhesion tester opposite the side of the individual's back from which the strip was to be removed. The adhesion tester was aligned with, and was at the same height as, the strip to be removed. An example of a suitable adhesion tester for use in this test comprises a conventional motor driven screw with moving carriage and a transducer. Connection to the transducer was a load cell accessory. Removal force placed on the transducer resulted in a signal change which was passed through a readout meter to a strip chart recorder.

The strip was pulled over itself in plane parallel (180°) to the back and the rate of removal is 6 inches (15.2 cm) per minute. To determine skin adhesion, the strip is removed within about 5 minutes of its application to the back.

ADHESIVE TERPOLYMERS

Pressure-sensitive adhesive terpolymers comprising A, B and C monomers as indicated (TABLE I) were prepared in accordance with the disclosure of International application No. PCT/US84/00506. The desired amounts of A, B and C monomers in an organic solvent, e.g., ethyl acetate at 40–50 percent solids, are combined in a sealable bottle. A solvent such as isopropyl alcohol which functions as a chain transfer agent is also present in the reaction medium in order to control the molecular weight of the terpolymer. A catalytic amount of a free radical initiator 2,2'-azobisisobutyronitrile ("VAZO 64" available from E. I. DuPont de Nemours) is then added to the solution. The bottle is purged with nitrogen and sealed. The sealed bottle is tumbled in a heated water bath for sufficient time to effect complete polymerization, e.g., 24 hours in a 55° C. water bath.

Inherent viscosity was measured by conventional means using a Cannon Fenske #50 viscometer in a water bath controlled at 25° C. to measure the flow time of 10 ml of a polymer solution (0.2 g of polymer per deciliter in ethyl acetate).

TABLE I

| | ADHESIVE TERPOLYMERS | | |
|---|---|---|---|
| No. | Monomers | Ratio | IV |
| 1 | IOA/EOA-16/AA | 70/15/15 | 0.84 |
| 2 | IOA/EOA-16/AA | 70/15/15 | 0.72 |
| 3 | IOA/EOA-16/AA | 70/15/15 | 0.54 |
| 4 | IOA/EOA-114/AA | 70/15/15 | 0.76 |
| 5 | IOA/EOA-2/AA | 70/15/15 | 0.77 |
| 6 | IOA/PTMO/AA | 70/15/15 | 1.02 |
| 7 | IOA/EOA-16/AA | 65/15/20 | 1.10 |
| 8 | IOA/EOA-16/AA | 60/20/20 | 0.73 |
| 9 | IOA/AA | 94/6 | 0.80 |

AA is Acrylic Acid
IOA is isooctylacrylate
EOA-16 is Carbowax 750 acrylate
EOA-2 is ethoxyethoxyethyl acrylate
EOA-114 is Carbowax 5000 acrylate
PTMO is poly(tetramethylene oxide) acrylate (The EOA and PTMO acrylates were prepared according to the procedure described in International Application No. PCT/US84/00506. The number following the letters "EOA" designates the number of ethylene oxide units in the polyether chain.) "Carbowax" is a methoxy poly(ethylene oxide) ethanol available from Union Carbide Corp.

REINFORCING POLYMERS

A N-vinylpyrrolidone/vinyl acetate copolymer (3/1) having a molecular weight of 7500 was prepared as follows.

Into a 500 ml 3-neck round bottom flask was charged 75 g N-vinylpyrrolidone, 25 g vinylacetate, 3.8 g dodecylmercaptan, and 70 g ethyl acetate. A mechanical stirrer, reflux condenser, and thermometer were attached, the head space was purged with nitrogen and the mixture heated to 55° C. 0.05 g of "VAZO 64" (2,2-azobis(isobutylonitrile)) was added and stirring at 55° C. continued under a positive nitrogen pressure for 22 hours. At this point, an additional 0.05 g VAZO 64 was charged, and the reaction continued for 7 hours. The resulting viscous, hazy solution was cooled, diluted with 200 ml methylene chloride and the product precipitated into 500 ml cyclohexane. The resulting solid was washed three times with cyclohexane and dried overnight in a vacuum oven. The yield was 84 g of a brittle off-while solid.

Following the above general procedure, other carbonylamido group-containing polymers (Nos. 4–7 in the following table) were prepared.

| REINFORCING POLYMERS | | | |
|---|---|---|---|
| No. | Abbr. | Composition | Mol. Wt. |
| 1 | PEOx[1] | Poly(2-ethyl oxazoline) | 50,000 |
| 2 | PVP[2] | Poly(N—vinyl pyrrolidone) | 40,000 |
| 3 | PVP-VOAc | Poly(NVP-co-vinyl acetate) 3/1 | 7,500 |
| 4 | PDMACM | Poly(N,N—dimethylacrylamide) | 5,000 |
| 5 | DMACM/IOA | Poly(N,N—dimethylacrylamide-co-iso-octylacrylate) 3/1 | 7,500 |
| 6 | PtBuACM | Poly(N—t-butylacrylamide) | 5,000 |
| 7 | PtOACM | Poly(N—t-octylacrylamide) | 5,000 |

[1] Purchased from Dow Chemical Co., Midland, Michigan, as PEO × 50.
[2] Purchased from GAF, New York, New York as PVP K30.

Adhesive blends according to the invention with varying weight percents of reinforcing polymer were prepared as set forth in the following Table II. The reinforcing polymer, as a solid or in solution, was added to the adhesive polymer solution and mixed by stirring or tumbling until homogenous. The blend was coated on a release liner so as to produce a film having a thickness of 1–1.5 mils (0.025–0.038 mm) after drying at 220°–240° F. for 5–10 minutes. Where necessary for carrying out a test, the adhesive was laminated to the appropriate backing. Samples were conditioned for 24 hours at 70° F., 50% RH before testing. A dash (—) indicates the data is not available.

| Ex No. | Polym | Reinf | % Reinf | Tack | Skin Adhesion[1] g/in | N/100 mm | MVTR[2] | Tens. kPa | Elong. % |
|---|---|---|---|---|---|---|---|---|---|
| 1 | 1 | — | — | 5 | 83 | 3.205 | 1746 | — | — |
| 2 | 1 | 1 | 5 | 3 | 27 | 1.042 | 1801 | 827.6 | 740 |
| 3 | 1 | 1 | 6 | 3 | 33 | 1.274 | 1975 | — | — |
| 4 | 1 | 2 | 3.2 | 4 | 24 | 0.927 | 1959 | — | — |
| 5 | 1 | 2 | 5 | 2 | 15 | 0.579 | 1857 | 1103.4 | 550 |
| 6 | 1 | 3 | 3.1 | 4 | 30 | 1.158 | 1786 | — | — |
| 7 | 1 | 3 | 5 | 4 | 19 | 0.733 | 1857 | 1034.5 | 500 |
| 8 | 1 | 4 | 2.8 | 4 | 34 | 1.313 | 1888 | — | — |
| 9 | 1 | 4 | 5 | 5 | 22 | 0.849 | 1809 | 896.6 | 550 |
| 10 | 1 | 5 | 4.3 | 5 | 39 | 1.506 | 1786 | — | — |
| 11 | 1 | 5 | 5 | 5 | 38 | 1.467 | 1762 | 551.7 | 740 |
| 12 | 1 | 6 | 5 | 3 | 17 | 0.656 | 1706 | 1103.4 | 610 |
| 13 | 1 | 7 | 5 | 3 | 33 | 1.274 | 1676 | — | — |
| 14 | 2 | 1 | 6 | 3 | 15 | 0.579 | 1699 | — | — |
| 15 | 3 | 1 | 5 | 5 | 34 | 1.313 | 1770 | — | — |
| 16 | 4 | 1 | 5 | 3 | 18 | 0.695 | 1738 | — | — |
| 17 | 5 | 1 | 5 | 2 | 18 | 0.695 | 1359 | — | — |
| 18 | 6 | 1 | 5 | 4 | 15 | 0.579 | 1248 | — | — |
| 19 | 7 | 1 | 5 | 2 | 16 | 0.618 | 2323 | — | — |
| 20 | 8 | 1 | 5 | 3 | 13 | 0.502 | 1770 | — | — |
| 21 | 8 | 4 | 5 | 3 | 45 | 1.737 | 1849 | — | — |
| 22 | 9 | 1 | 5 | 5 | 57 | 2.200 | 901 | — | — |

[1] Skin Adhesion in units of grams/inch (g/in) and Newtons/100 millimeters (N/100 mm)
[2] Moisture Vapor Transmission Rate in units of g/m²/24 h at 1 mil (0.025 mm) on porous backing The present invention may be embodied in other specific forms without departing from its spirit or essential characteristics. The described embodiments are to be considered in all respects only as illustrative and not restrictive. The scope of the invention is, therefore, indicated by the appended claims rather by the foregoing description. All changes which come within the meaning and range of equivalency of the claims are to be embraced within their scope.

What is claimed and desired to be secured by U.S. Letters Patent is:

1. A pressure-sensitive adhesive mass comprising a blend of the following:
   a. a terpolymer pressure sensitive adhesive of A, B and C monomers where A is a hydrophobic monomeric acrylic acid ester of a non-tertiary alcohol, said alcohol having from 4 to about 14 carbon atoms; B is at least one polar monomer copolymerizable with said A monomer having hydroxyl, carboxylic, sulfonic or phosphoric functionality, the amount of weight of B monomer being about 2 to 30% of the total weight of all monomers in the copolymer; and C is a hydrophilic macromolecular monomer of the formula X—Y—Z wherein X is a vinyl group copolymerizable with the A and B monomers, Y is a divalent linking group, and Z is a monovalent polymeric moiety comprising a polyether essentially unreactive under free radical initiated copolymerization conditions, the amount by weight of C monomer being about 5 to 30% of the total weight of all monomers in the terpolymer;
   b. at least one carbonylamido group-containing polymer;

said carbonylamido group-containing polymer being present in sufficient amounts to provide said adhesive mass with a tensile strength of at least 400 KPa and maximum elongation of about 1,000 percent; and said adhesive mass, when measured as a 1 mil (0.025 mm) thick film having a moisture vapor transmission of at least 1,000 grams per square meter per 24 hours at 40° C. and a relatative humidity differential of about 80 percent.

2. The adhesive according to claim 1 where said carbonylamido group-containing polymer is selected from the group consisting of:

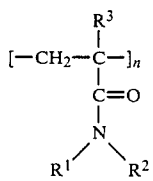   I

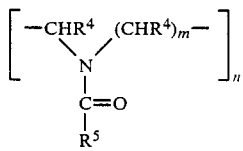   II

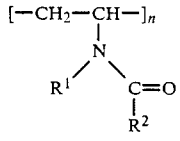   III

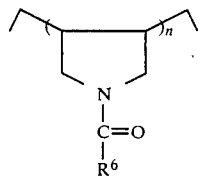   IV where
R¹ and R² independently represent an alkyl or inertly-substituted alkyl group having from one to eight carbon atoms, or R¹ and R² together can be represented by ($-CH_2-$)$_x$ where x is an integer from two to five, or R² can be hydrogen;
R³ represents hydrogen or an alkyl or inertly-substituted alkyl group having from one to six carbon atoms;

R[4] represents hydrogen or an alkyl or inertly-substituted alkyl group having from one to three carbon atoms; and m is one or two;

R[5] represents hydrogen, aryl or alkyl having up to about 20 carbon atoms or inertly-substituted derivatives thereof; and R[6] represents hydrogen or an alkyl or inertly-substituted alkyl group having from one to eight carbon atoms.

3. The adhesive according to claim 2 wherein R[1] is an alkyl group having one to three carbon atoms.

4. The adhesive according to claim 3 wherein R[2] is an alkyl group having one to three carbon atoms.

5. The adhesive according to claim 2 wherein R[3] is an alkyl group having one to six carbon atoms.

6. The adhesive according to claim 2 wherein R[3] is hydrogen.

7. The adhesive according to claim 2 wherein R[3] is a methyl group.

8. The adhesive according to claim 2 wherein R[6] is an alkyl group having one to eight carbon atoms.

9. The adhesive according to claim 8 wherein R[6] is an alkyl group having one to three carbon atoms.

10. The adhesive according to claim 1 wherein said carbonylamido-group containing polymer is selected from the group consisting of a poly(alkyloxazoline) having a molecular weight above about 1,000, a poly(N-vinyl lactam), a copolymer of a N-vinyl lactam, a polymer of a mono- or dialkyl substituted acrylamide, a copolymer of a mono- or dialkyl acrylamide, and a mixture of two or more of the foregoing.

11. The adhesive according to claim 10 wherein said carbonylamido group-containing polymer is selected from the group consisting of a polymer of a mono-alkyl substituted acrylamide wherein the alkyl group contains four to eight carbon atoms, a polymer of a di-alkyl substituted acrylamide wherein the alkyl groups contain one to four carbon atoms; a copolymer of a mono-alkyl substituted acrylamide wherein the alkyl group contains four to eight carbon atoms and a copolymer of a dialkyl substituted acrylamide wherein the alkyl groups contain one to four carbon atoms.

12. The adhesive according to claim 1 wherein said A monomer is a hydrophobic monomeric acrylic acid ester of a nontertiary alcohol contains about 6 to 12 carbon atoms.

13. The adhesive according to claim 12 wherein said alcohol contains 8 carbon atoms.

14. The adhesive according to claim 1 wherein said X group of said C monomer is of the formula

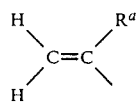

wherein R[a] is a hydrogen atom or a methyl group.

15. The adhesive according to claim 1 wherein the Y group of said C monomer is

16. The adhesive according to claim 1 wherein said Z moiety of said C monomer is a monovalent polyether moiety of the following formula —W—OR[b]

wherein R[b] is hydrogen, lower alkyl, phenyl or substituted phenyl; and W is a divalent poly(alkylene oxide) group containing 2 to about 250 repeating alkoxide units and selected from the group consisting of a poly(ethylene oxide) radical, a poly(propylene oxide) radical, a radical of a copolymer of ethylene oxide and propylene oxide, and a poly(tetramethylene oxide) radical.

17. The adhesive according to claim 16 wherein W contains about 5 to 250 repeating alkoxy units.

18. The adhesive according to claim 17 wherein W of said Z moiety is selected from the group consisting of a poly(ethylene oxide) radical, a poly(propylene oxide) radical and a radical of a copolymer of ethylene oxide and propylene oxide.

19. The adhesive according to claim 1 wherein said C monomer is of the following formula

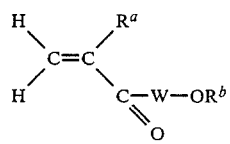

wherein R[a] is hydrogen or methyl; R[b] is hydrogen, lower alkyl, phenyl or substituted phenyl; and W is a divalent poly(alkylene oxide) group containing 2 to about 250 repeating alkoxide units and selected from the group consisting of a poly(ethylene oxide) radical, a poly(propylene oxide) radical, a radical of a copolymer of ethylene oxide and propylene oxide, and a poly(tetramethylene oxide) radical, W being bonded covalently to the carbonyl group via a terminal oxygen atom contained in W.

20. The adhesive according to claim 1 wherein the weight of said hydrophilic macromolecular monomer C is about 5 to 30% of the total weight of all monomers in said copolymer.

21. The adhesive according to claim 1 wherein said polar monomer B is selected from the group consisting of acrylic acid, methacrylic acid, 2-carboxyethyl acrylate, itaconic acid, 2-hydroxyethylacrylate, hydroxypropylacrylate, and 2-sulfoethylmethacrylate.

22. The adhesive according to claim 21 wherein said polar monomer B is a acrylic acid.

23. The adhesive according to claim 1 wherein the amount by weight of said polar monomer B is from about 10% to about 15% of the total weight of all monomers in the terpolymer.

24. The adhesive according to claim 1 wherein said carbonylamido group containing polymer is a poly(alkyloxazoline) having a repeating unit of the following formula:

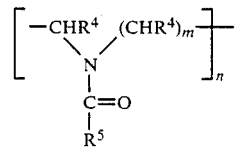

wherein R[4] is hydrogen or an inertly-substituted lower alkyl group, m is 1 or 2, and R[5] is selected from the group consisting of hydrogen, phenyl, inertly-substituted phenyl, alkyl having up to about 20 carbon atoms, or inertly-substituted alkyl.

25. The adhesive according to claim 24 wherein m is 1, $R^4$ is hydrogen, and $R^5$ is selected from hydrogen and alkyl groups containing up to about 10 carbon atoms.

26. The adhesive according to claim 24 wherein m is 1, $R^4$ is hydrogen, and $R^5$ is selected from hydrogen, methyl, ethyl and propyl.

27. The adhesive according to claim 1 wherein the amount of said carbonylamido group-containing polymer is in the range of about 1.5 parts to about 8 parts by weight of said carbonylamido group-containing polymer per 100 parts by weight of the combined weight of said terpolymer and said carbonylamido group-containing polymer.

28. The adhesive according to claim 24 wherein said poly(alkyloxazoline) has a molecular weight within the range of about 1,000 to about 2,000,000.

29. The adhesive according to claim 28 wherein said poly(alkyloxazoline) has a molecular weight within the range of about 2,000 to about 500,000.

30. The adhesive according to claim 1 having a tensile strength of 500–1500 KPa and a maximum elongation of 500 to 750 percent.

* * * * *